United States Patent [19]  
Stanley

[11] 4,024,670  
[45] May 24, 1977

[54] SHIPPING AND GROWING APPARATUS FOR SEEDS

[76] Inventor: Peter W. Stanley, 167 Cranston Court, Glen Ellyn, Ill. 60137

[22] Filed: Oct. 20, 1975

[21] Appl. No.: 624,265

[52] U.S. Cl. .................................. 47/73; 47/84
[51] Int. Cl.² .................................. A01C 11/00
[58] Field of Search ............ 47/34, 34.13, 37, 38, 47/41.13, 66, 71, 73–78, 84–86

[56] References Cited

UNITED STATES PATENTS

| 1,865,960 | 7/1932 | Regelson | 47/34.13 |
| 2,331,397 | 10/1943 | Hummel | 47/34 R |
| 3,048,942 | 8/1962 | Boetticher et al. | 47/41.13 |
| 3,375,607 | 4/1968 | Melvold | 47/37 |
| 3,830,015 | 7/1974 | Belgiorno | 47/34 R |

Primary Examiner—Edgar S. Burr  
Assistant Examiner—James R. Feyrer  
Attorney, Agent, or Firm—Patrick D. Ertel

[57] ABSTRACT

A device for both shipping and starting the growth of plant seeds. Two container portions are mutually engageable to form a receptacle for the transportion of plant seeds and cylindrical disks of plant growth mattter. The container portions are substantially identical. and interchangeable as the repository and cover member of the receptacle. Each container portion has three compartments formed by three partitions rising orthogonally from the base of the container and abutting equiangularly about the center of the base. A pair of ribs is disposed in each compartment between adjacent abutting partitions, and a vertical projection extends upward from the side of the container within each compartment generally along a line bisecting the angle formed by adjacent abutting partitions. Preferably, an upright member is attached to the end of each of the partitions, rising from the base of the container to a height slightly less than that of the upper edge of the container. Each pair of ribs supports the bottom of a disk of plant growth matter, while the adjacent abutting partitions, upright members and projection engage the periphery of the disk to prevent lateral movement. When transporting the device, six disks are located in the repository, two being stacked vertically in each compartment. When the cover is placed on the repository, it is situated so that an upright member in the cover extends above each compartment in the repository. The upright member can be of a sufficient height to securely retain the disks, or the upright member, in combination with printed matter, such as instructions and seed packages placed on top of the stacks of disks, can securely retain the disks.

9 Claims, 5 Drawing Figures

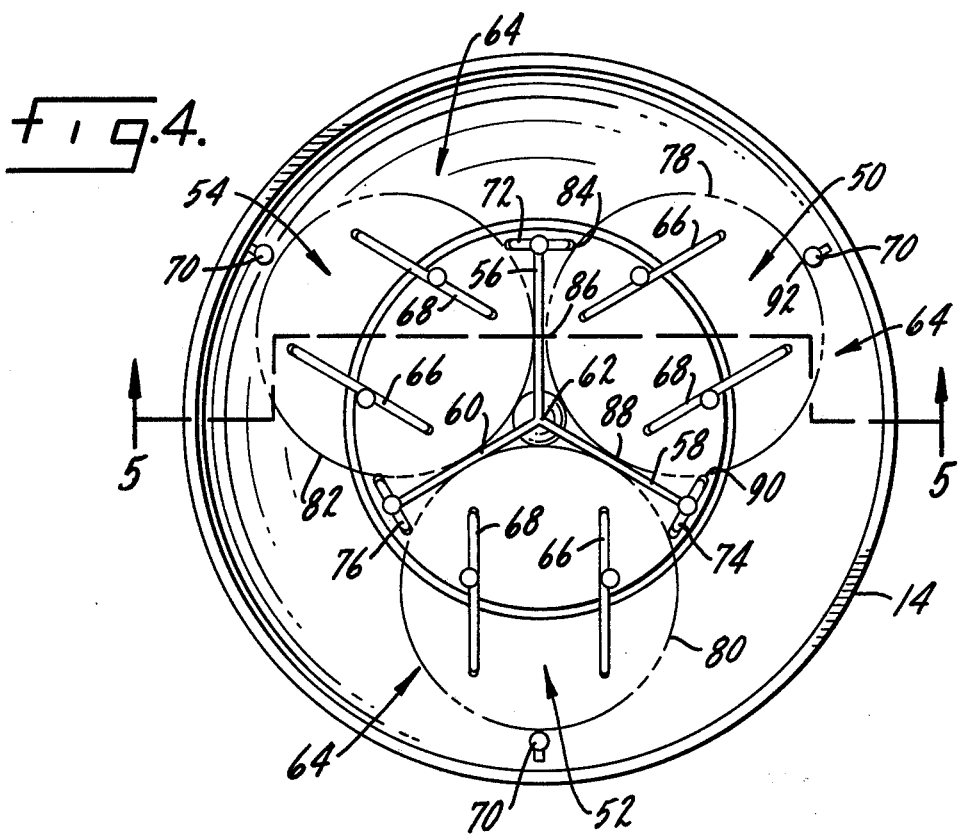
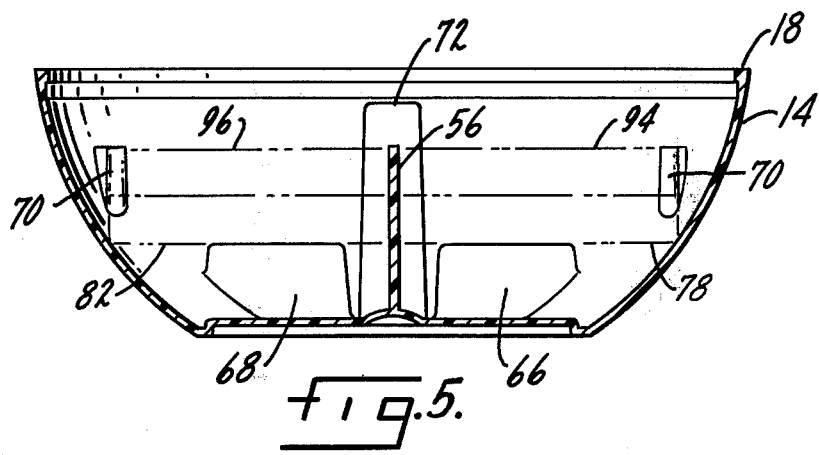

SHIPPING AND GROWING APPARATUS FOR SEEDS

SUMMARY OF THE INVENTION

The Background

This invention relates to a device for shipping and starting the growth of plant seeds, and more particularly to a novel receptacle for containing a plurality of plant seeds and plant growth matter.

Self-contained packages for merchandising and germinating plant seeds, known as "Seed Starters," are well known, as exemplified by U.S. Pat. No. 3,032,927. Such devices normally comprise a tray of plant growth matter, such as vermiculite or porous soil, and a cover member to which a plurality of plant seeds is adhesively affixed. In using the device, one punctures the cover above each seed and adds water to the tray. The cover is normally removed immediately after adding water to the tray or after the plant seeds have begun to germinate.

Such devices, although capable of producing a plurality of plants at an economical cost, are often cumbersome and untidy in use, and are susceptible of being over- or under-watered resulting in a smaller crop of germinated seedlings than would otherwise be expected.

The Invention

These problems and others are solved according to the present invention by providing a device for shipping and starting the growth of plant seeds comprising complementary first and second container portions. The container portions are mutually engageable to form a receptacle for the transportation of plant seeds and plant growth matter, each of the container portions being interchangeable as the repository and cover member of the receptacle. A support means is formed in each container portion to hold at least one mass of plant growth matter during utilization of the device as a growing container. There is also provided means for immobily retaining at least twice as many masses of plant growth matter during utilization of the device as a transportation receptacle than are supported in each of the container portions during utilization of the device as growing container.

According to a preferred embodiment of the invention, a plurality of generally vertical partitions emanate radially from a common locus rising from the base of the container portions to form compartments therein. In each compartment, two substantially parallel ribs are attached to the base of each container portion between adjacent vertical partitions. A vertical projection also extends upward into each compartment from the side of each container portion. The ribs provide base supports for masses of plant growth matter while the partitions and projections engage the peripheries of masses of plant growth matter to prevent lateral movement within the container portions.

Three such compartments will normally be formed in each container portion. The compartments are preferably further defined by upright members attached to the ends of each of the vertical partitions. The upright members are generally perpendicular to the partitions and to the base of the container portion and they are formed to further engage the peripheries of masses of plant growth matter. The upper edge of each container portion will normally extend to a height slightly greater than that of the upright members.

For shipping the device, six masses of plant growth matter are placed in the repository with two in each of the compartments. The cover member is then placed on the device with each of the upright members in the cover disposed generally above each of the compartments in the repository. The masses of plant growth matter are securely retained in the device for shipping by the upright member alone, or in combination with printed instructions or the like.

For starting the growth of plant seeds, the cover member is removed from the device and inverted. One mass of plant growth matter is removed from each of the compartments of the repository and placed in each of the compartments of the cover member. The masses of plant growth matter are watered and the seeds are planted.

Since masses of plant growth matter are supported above the base of each container portion, any excess water drains into the reservoir beneath the masses of plant growth matter. The reservoir prevents overwatering of seedlings germinated in the masses of plant growth matter. Furthermore, the water collected in the reservoir beneath the masses of plant growth matter provides a high percentage of humidity without root rot to the seedlings which enhances the growing environment.

By reason of the various features and advantages of the invention as described in detail hereinafter, a device for shipping and starting the growth of plant seeds is provided which facilitates transportation of both seeds and their growth matter as well as promotes greatly enhanced changes of successful germination of plant seedlings.

BRIEF DESCRIPTION OF THE DRAWINGS

An embodiment of the invention is illustrated in the following drawings, in which:

FIG. 4 is a plan view taken along line 4—4 of FIG. 1 showing an interior view of a repository of the receptacle with supported masses of plant growth matter shown in phantom; and FIG. 5 is a cross section taken along line 5—5 of FIG. 4 showing an interior view of a repository of the receptacle with supported masses of plant growth matter shown in phantom.

DETAILED DESCRIPTION OF THE INVENTION

Figure 1:
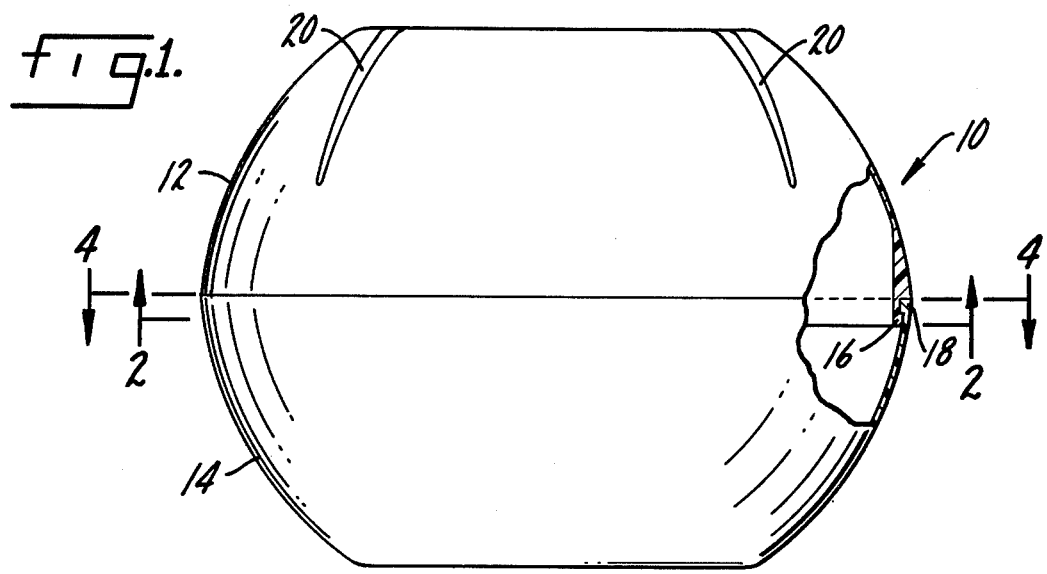
FIG. 1 is a side elevation, with portions removed, of a receptacle formed according to the present invention.

The device according to the invention is generally depicted at 10 in FIG. 1 and comprises a first container portion 12 and a second container portion 14. For purposes of illustration, the first container portion 12 is a male portion and the second container portion 14 is a female portion. The male first container portion 12 includes a circumferential flange 16 which matingly engages the like circumferential flange 18 of the female second container portion 14. The flanges 16 and 18 form no part of the invention, however, and may be substituted with other like means to matingly engage the two container portions.

To give the embodiment of the invention illustrated in the drawings the physical appearance of a tomato, each of the container portions can be fashioned from a red plastic material with the first container portion 12 having a plurality of recessed furrows 20. The physical appearance of the device 10 can similarly be adapted to resemble other fruits and vegetables by changing the exterior shape and ornamentation. Excepting the circumferential flanges and the shape and ornamentation of the device, however, the first container portion 12 and the second container portion 14 are preferably structurally identical for all embodiments of the invention.

Figure 2:
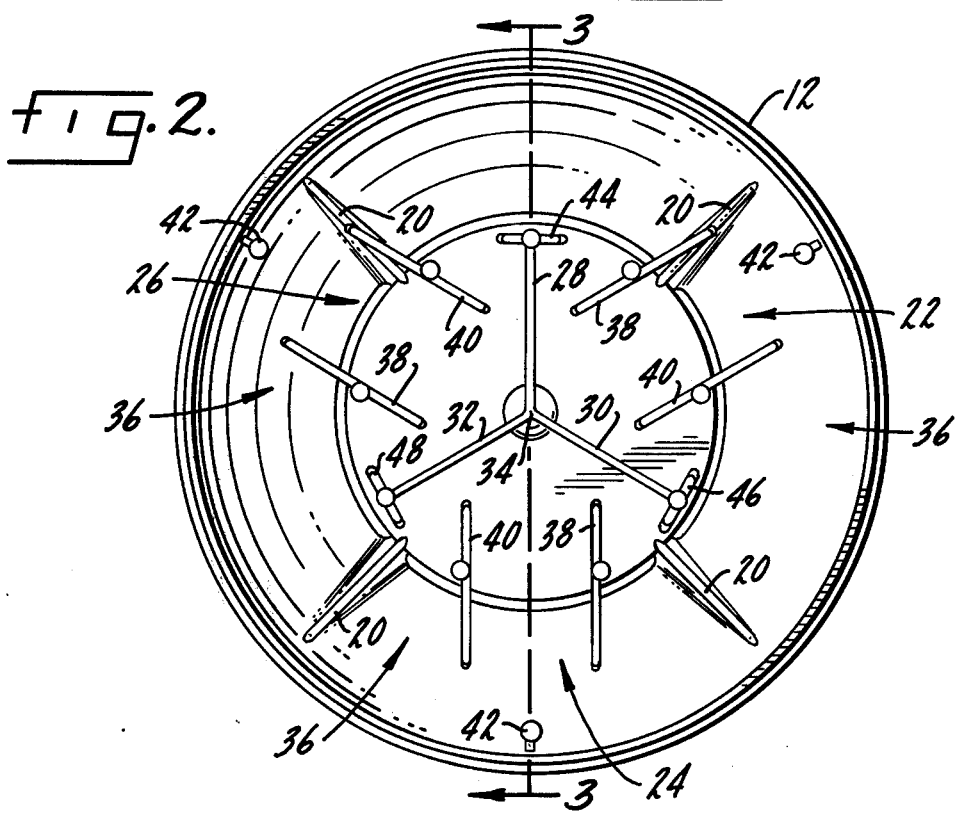
FIG. 2 is a plan view taken along line 2—2 of FIG. 1 showing an interior view of a cover member of the receptacle.
Figure 3:
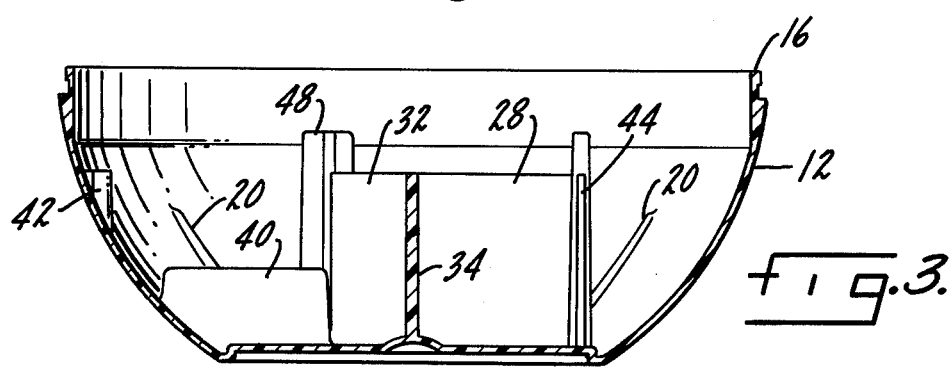
FIG. 3 is a cross section taken along line 3—3 of FIG. 2 showing an interior view of a cover member of the receptacle.

As illustrated in FIG. 2 and 3, the first container portion 12 includes three individual compartments 22, 24 and 26 formed by three partitions 28, 30, and 32 rising orthogonally from the base of the container portion 12 and abutting at a junction 34 equiangularly about the center of the base of the container portion. Although three compartments have been illustrated, it should be evident that any number of compartments may be partitioned within each container portion, the number and placement of compartments being limited only by the size and shape of the container portions and the bulk of the mass of plant growth matter contained in each compartment.

Support means 36 is formed in each of the compartments 22, 24, and 26 including first and second upright means to hold at least one mass of plant growth matter during utilization of the device 10 as a growing container. The first upright means includes two parallel ribs 38 and 40 jutting upward from the base of the container portion 12 in each of the compartments. Each of the compartments also has a generally vertical projection 42 extending upward from the side of the container portion 12, and upright members 44, 46, and 48 further define each of the compartments and are attached generally perpendicularly to the ends of the partitions and to the base of the container portion 12. The second upright means includes partitions 28, 30, and 32, which are preferably shorter than upright members 44, 46, and 48, as well as the upright members themselves in each of the compartments. Together, the ribs, projections, upright members, and partitions cooperate to define the first and second upright means of the support means 36 in each of the compartments 22, 24, and 26.

The inner structure of the second container portion 14 is illustrated in FIGS. 4 and 5. Structurally identical to the first container portion 12, the second container portion 14 has three compartments 50, 52 and 54 formed partitions 56, 58 and 60, which are generally perpendicular to the base of the container portion 14, extending radially outward from a common junction 62. A pair of parallel ribs 66 and 68 is disposed in each of the compartments. A generally vertical projection 70 also extends upward into each of the compartments. Upright members 72, 74 and 76 are preferably taller than partitions 56, 58 and 60 and are attached generally perpendicular to the ends of the partitions and to the base of the second container portion 14. A support means 64 is formed in each of the three compartments 50, 52 and 54 including first and second upright means by the cooperation of the ribs, projections, upright members and partitions.

Illustrated in phantom in FIGS. 4 and 5 are masses of seed growth matter situated within the second container portion 14. Any suitable mass of matter which promotes the growth of seedlings may be utilized, although the applicant has found it most desirable to utilize compacted briquettes of peat moss sold under the trade name "Jiffy-7" and manufactured according to U.S. Pat. No. 3,375,607. Such briquettes are extremely desirable due to their initial compactness and ability to expand to many times their compact size upon the application of water. The expanded briquette is sufficiently porous and of a volume large enough for use in starting and growing plant seedlings.

As illustrated in FIG. 4, three masses of plant growth matter 78, 80 and 82 are placed within compartments 50, 52, and 54, respectively, during utilization of the second container portion 14 as a growing container. Likewise, three masses of plant growth matter would be disposed within compartments 22, 24 and 26 during utilization of the first container portion 12 for this purpose. Each of the masses of plant growth matter is supported by first and second support means which hold the plant growth matter above the base of the container portion precluding lateral movement within the container portion by means of the cooperation of the ribs, projections, upright members, and partitions. For example, the mass of plant growth matter 78 is supported by support means 64 which precludes movement due to the cooperation of the ribs 66 and 68, the end 84 of the upright member 72, the side 86 of the partition 56, the side 88 of the partition 58, the end 90 of the upright member 74, and the edge 92 of the vertical projection 70. In this manner, each of the masses of plant growth matter is securely positioned within its respective container portion 12 or 14 during utilization of the device as a growing container.

In FIG. 5, two masses of plant growth matter are shown vertically stacked in each compartment as they would be situated during utilization of the device as a transportation receptacle. Second masses of plant growth matter 94 and 96 are placed upon the respective masses 78 and 82, with the height of each stack depending on the relative thickness of the particular masses of plant growth matter utilized. Instructions, a package of seeds, and other desired printed matter can be placed on top of the stacks of plant growth matter, and the first container portion 12 placed thereon as a cover. In order to assure that each stack of masses of plant growth matter remains within its respective compartment, the first container portion 12 is placed on the second container portion 14 such that each of the upright members 44, 46 and 48 is disposed above the central portion of one of the compartments 50, 52 or 54. As long as the first container portion 12 remains engaged with the second container portion 14 during the transportation of the device, no matter how rough the handling thereof, the stacks of masses of plant growth matter will remain in their respective compartments.

Masses of plant growth matter can be deposited in the repository in many other fashions and still be maintained securely therein during utilization of the device 10 as a shipping container. Since the ribs 38 and 40, and 66 and 68, are parallel, two such masses, in the disk form illustrated in FIGS. 4 and 5, can be placed on edge therebetween rather than being vertically stacked thereon. Placing the masses on edge may be more advantageous if instructions are to be placed in the device and aid, in combination with the upright members, in maintaining the masses securely within the repository during shipping.

The assembled device is utilized as follows:

The first container portion 12 is separated from the second container portion 14 and inverted. One mass of plant growth matter is removed from each of the compartments 50, 52 and 54 of the second container portion 14 and placed in each of the compartments 22, 24 and 26 of the first container portion 12. Water is then added to each of the compartments of each container portion causing each mass of plant growth matter to fully expand as described in U.S. Pat. No. 3,375,607. One or more seeds is then placed in each of the masses of plant growth matter. Since the expanded masses of plant growth matter stand well above the top edge of each of the container portions, over-watering thereof during germination of the seeds is practically impossible. When seedings have sprouted and climatic conditions are appropriate, the seedlings and their masses of plant growth matter are removed from the container portions and planted outdoors.

Various changes can be made to the above described invention without departing from the spirit thereof. For example, although the device 10 is shown to be generally spherical, it may be formed in a generally oblong configuration such as that of a cucumber or zucchini squash with one or more compartments for the masses of plant growth matter formed longitudinally within the device. Also, the integral partitions, upright members, and vertical projections forming the compartments may be replaced with a suitable permanent insert formed to hold one or more of the masses of plant growth matter. It should therefore be apparent that changes can be made which do not depart from the spirit of the invention. Accordingly, it is to be understood that the invention is to be limited solely by the scope of the appended claims.

I claim:

1. A device for shipping and starting the growth of plant seeds, comprising:
  a. complementary first and second container portions, said portions being mutually engageable to form a receptacle for transportation of plant seeds and plant growth matter, each of said container portions being functionally identical and interchangeable as a repository and a cover member of said receptacle and constructed and arranged to retrain at least twice as many masses of plant growth matter in said repository during utilization of the device as a transportation receptacle than are supported in each of said container portions during utilization of the device as a growing container; and
  b. first and second upright permanent support means in each of said container portions for holding at least one mass of plant growth matter above the base of each of said container portions during utilization of the device as a growing container, said support means in said container portions cooperating with each other during utilization of the device as a transportation receptacle such that said support means in said repository defines a compartment providing lateral support for a plurality of said masses of plant growth matter and said second support means in said cover member retains said masses of plant growth matter in said compartment.

2. The device of claim 1 in which said second support means in said cover member is offset relative to said second support means in said repository during utilization of the device as a transportation receptacle.

3. The device of claim 1 in which each of said container portions comprises a curved vessel with a flat bottom.

4. The device of claim 1 in which said first support means includes means attached to the base of each of said container portions for providing a base support for each mass of plant growth matter during utilization of the device as a growing container.

5. The device of claim 4 in which said means attached to the base comprises two parallel ribs.

6. The device of claim 1 in which said second support means includes at least two abutting partitions rising orthogonally from the base of each of said container portions formed to engage the periphery of each mass of plant growth matter during utilization of the device as a growing container.

7. The device of claim 6 in which each of said partitions in said cover member comprises said means for retaining masses of plant growth matter in said compartment of said repository during utilization of the device as transportation receptacle.

8. The device of claim 6 in which said second support means includes an upright member attached to the end of each of said partitions perpendicular to said partition and to the base of said container portion formed to engage the periphery of each mass of plant growth matter during utilization of the device as a growing container.

9. The device of claim 8 in which each of said upright members in said cover member comprises said means of retaining masses of plant growth matter in said compartment of said repository during utilization of the device as a transportation receptacle.

* * * * *